April 14, 1964
E. E. REESE
3,128,491
WINDSHIELD WIPER BLADE ASSEMBLY
Filed Nov. 3, 1961
2 Sheets-Sheet 1
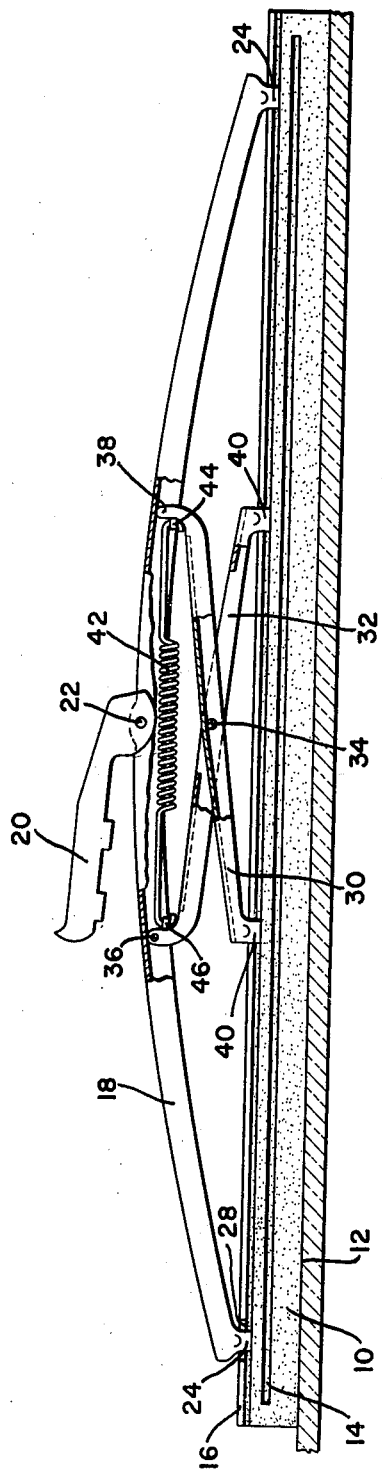
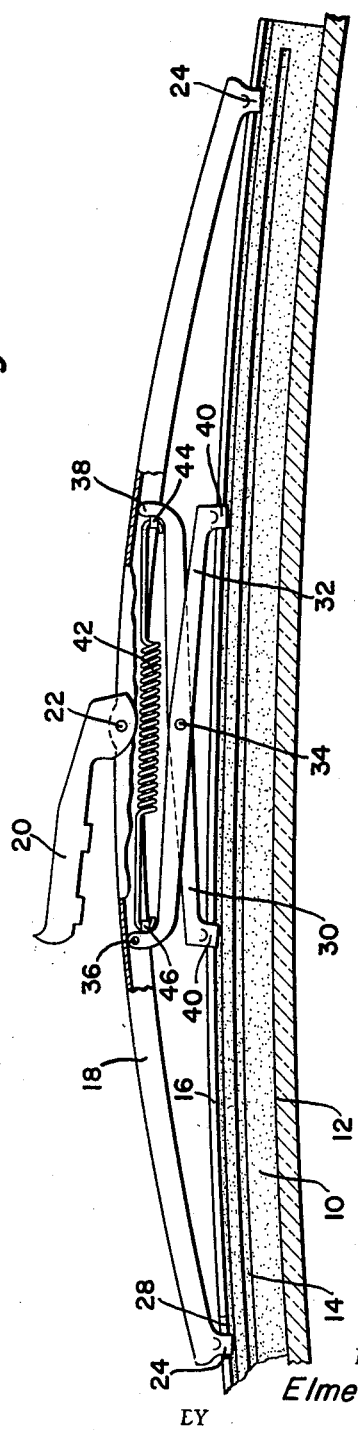
INVENTOR.
Elmer E. Reese
BY
W. E. Finken
His Attorney April 14, 1964 E. E. REESE 3,128,491
WINDSHIELD WIPER BLADE ASSEMBLY
Filed Nov. 3, 1961 2 Sheets-Sheet 2

INVENTOR.
Elmer E. Reese
BY
His Attorney

United States Patent Office 3,128,491
Patented Apr. 14, 1964

3,128,491
WINDSHIELD WIPER BLADE ASSEMBLY
Elmer E. Reese, Rochester, N.Y., assignor to General Motors Corporation, Detroit, Mich., a corporation of Delaware
Filed Nov. 3, 1961, Ser. No. 150,041
5 Claims. (Cl. 15—250.42)

This invention pertains to windshield wiper blade assemblies, and particularly to improved pressure applying superstructures for supporting squeegee units adapted to conform to curved surfaces.

Heretofore, pressure applying superstructures for flexible squeegee units have included a plurality of relatively movable yokes or levers, the free ends of which are slidably connected at a plurality of longitudinally spaced points to the backing of the squeegee unit for conforming the same to varying curvatures of the surface over which it is moved. One of the problems attendant with wiper blade assemblies of the foregoing types is that all of the pressure for both maintaining the wiper blade in engagement with the surface as well as for conforming the blade to the varying curvatures thereof is derived from the spring hinge connected sections of a wiper arm, and hence these blades are subjected to wind lift particularly during high speed driving. The present invention relates to improved pressure applying superstructures including pivotally interconnected links which can be spring biased to react against the applied arm pressure so as to minimize the effects of wind lift.

Accordingly, among my objects are the provision of a wiper blade assembly including a pressure applying superstructure having at least one pair of pivotally interconnected links carried by holder means; the further provision of a wiper blade assembly including a pressure applying superstructure having a spring biased scissors linkage; and the still further provision of a wiper blade assembly including a pressure applying superstructure having holder means and a pair of spaced apart, pivotally interconnected spring biased linkages for applying pressure to a squeegee unit.

The aforementioned and other objects are accomplished in the present invention by embodying at least one pair of pivotally interconnected links in the pressure applying superstructure and interconnecting the ends of the links by an extension spring. Specifically, two embodiments of an improved pressure applying superstructure are disclosed herein, each being designed for use with a squeegee unit comprising an elongate freely flexible rubber wiping element having a resiliently flexible backing, or support, secured thereto for confining flexure of the wiping element to a single plane substantially normal to the surface to be wiped. Preferably, although not necessarily, the flexible backing, or retention portion, is composed of a hard resiliently flexible plastic and is adhesively bonded to the rubber wiping element, a construction of this type being disclosed in copending United States application Serial No. 129,576 filed August 7, 1961, now U.S. Patent No. 3,097,389, in the names of Peter R. Contant et al., and assigned to the assignee of this invention. However, the improved pressure applying superstructure can be used equally as well with a conformable squeegee unit including a backing of spring metal.

In one embodiment the improved pressure applying superstructure comprises an elongate holder, or yoke, having a centrally arranged arm attaching part, the ends of the holder being slidably connected to the flexible backing adjacent its ends. The medial portion of the backing is supported by the ends of a scissors linkage comprising two crossed links which are pivotally connected at their centers, one end of one of the links being pivotally connected to the holder, and the other end of the other link being slidably supported by the holder. However, the scissors linkage can be pivotally connected off-center if desired to distribute pressure as desired, i.e., pressure can be varied at backing by varying the pivot point and spring load. The two free ends of the crossed links slidably engage the medial portion of the backing. An extension spring is arranged between the two ends of the scissors linkage which engage the holder, the extension spring tending to close the scissors linkage thereby producing reaction forces for applying pressure to the two spaced points of the medial portion of the backing. A conventional wiper arm having spring hinge connected inner and outer sections supplies conforming pressure through the holder to each end of the backing.

In the second embodiment the pressure applying superstructure comprises a holder, or primary yoke, having a centrally arranged arm attaching part, and a pair of spring biased linkages pivotally connected to each end of the holder. The two links at each end of the holder are pivotally connected to each other and to the holder, and their free ends slidably engage the backing. In addition, and extension spring is arranged between the two free ends of each pair of links tending to move the ends towards each other and thereby apply pressure to four spaced points along the backing. When the spring forces in the two linkages are exactly counter balanced by applied arm pressure, the two pairs of spring biased links react like secondary yokes, but under conditions of wind lift the scissors-type linkages of both embodiments will tend to maintain the squeegee unit in contact with the surface of the windshield.

Further objects and advantages of the present invention will be apparent from the following description, reference being had to the accompanying drawings wherein preferred embodiments of the present invention are clearly shown, and wherein similar numerals depict similar parts throughout the several views.

In the drawings:

FIGURE 1 is a side view partly in section and partly in elevation with certain parts broken away, of a wiper blade assembly constructed according to the first embodiment of this invention.

FIGURE 2 is a side view of the wiper blade assembly of FIGURE 1 conforming to a convexly curved surface.

Figure 3:
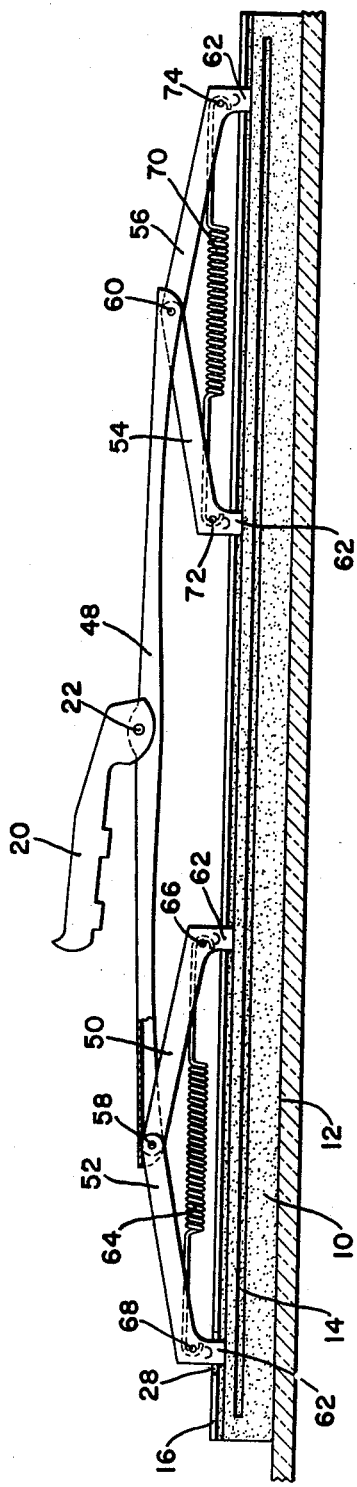
FIGURE 3 is a side view, in elevation, of the wiper blade assembly constructed according to the second embodiment of this invention.

With particular reference to FIGURE 1, the improved pressure applying superstructure of this invention are designed for use with a squeegee unit comprising a freely flexible rubber or rubber-like wiping element 10 having a wiping lip 12 and a pair of longitudinally extending flexure grooves 14. The flexure grooves 14 terminate short of the ends of the wiping element and enable the wiping lip to tilt so as to assume the proper drag position as it is moved across a surface to be cleaned. In order to confine flexure of the wiping element to a single plane substantially normal to the surface to be wiped, and to apply pressure to the wiping element throughout its length, the wiping element is carried by a coextensive flexible backing, or support, 16. The backing 16 forms a retention portion to which the pressure applying superstructure is connected, and by virtue of its greater width than thickness is readily flexible in a plane normal to the surface to be wiped while being substantially inflexible in a plane parallel to such surface. The backing may be composed of a relatively stiff resiliently flexible plastic, in which instance it is adhesively bonded to the rubber wiping element as set forth in the aforementioned copending application. Alternatively, the backing may comprise spring metal which is interlocked with the wiping element in any suitable manner.

The squeegee unit shown in FIGURE 1 is connected to a pressure applying superstructure. Stated another way, the wiping element 10 is carried by a resiliently flexible surface conforming support which includes the backing 16 and the pressure applying superstructure. The pressure applying superstructure of the first embodiment comprises a rigid channel-shaped holder, or primary yoke 18, having an arm attaching part 20 pivotally connected thereto by a pin 22 adjacent its center. Each end of the channel-shaped primary yoke 18 is formed with claws 24 adapted to straddle and slidably engage the backing strip 16 adjacent each end thereof. One of the claws 24 may be slidably interlocked with the backing strip 16 in a readily detachable manner such as shown in copending application Serial No. 82,810 filed January 16, 1961, in the name of Latone and assigned to the assignee of this invention. To accomplish this result the backing 16 is formed with notched margins 28 adjacent one end with an intermediate slot, not shown, which enables the marginal edges to be deflected towards each other to facilitate assembly and disassembly of the holder 18 therewith.

Pressure applied from a wiper arm, not shown, attached to the arm attaching part 20 is distributed to the squeegee unit by each end of the yokes at areas adjacent each end thereof. The medial portion of the squeegee unit is stabilized against lateral deflection and chatter by a scissors equalizer linkage. The scissors equalizer linkage comprises crossed links 30 and 32 pivotally interconnected between their ends by a pin 34. The inner end of link 32 is pivotally connected by a pin 36 to the holder 18 at a point spaced a substantial distance from the center of the holder. The inner end of link 30 is received between the side walls of the holder 18 and adapted for sliding movement relative thereto. To facilitate this sliding movement, the inner end of link 30 is formed with a smooth rounded end 38. The outer ends of crossed links 30 and 32 are formed with claws 40 identical to the claws 24 on the ends of the holder 18. The claws 40 of the crossed links 30 and 32 slidably engage the medial portion of the backing 16.

In order that the scissors equalizer linkage may apply pressure to the medial portion of the squeegee unit, an extension spring 42 is connected between hooks 44 and 46 formed adjacent the inner ends of the links 30 and 32. The extension spring 42 tends to slide the claws 40 of the scissors linkage towards each other thereby producing upward forces on the medial portion of the holder 18 and reaction downward forces at the claws 40 which function to maintain the medial portion of the blade in contact with the surface being wiped.

The extension spring 42 thus acts on the scissors linkage producing forces on the medial portion of the squeegee unit which react against arm applied pressure supplied to the holder 18 and distributed to the squeegee unit adjacent each end thereof. The combined resultant pressures from the arm and the extension spring maintain the wiping element in firm contact with the surface to be wiped throughout its length. When the wiper blade assembly engages a convexly curved surface, as seen in FIGURE 2, the arm applied pressure transmitted to the ends of the squeegee unit by the holder 18 conform the end portion of the squeegee unit to the curved surface with the resulting collapse of the scissors equalizer linkage. The crossed links 30 and 32 of the scissors linkage act conjointly due to the geometric arrangement of the parts and thus tend to lift the medial portion of the blade so as to conform it to the convexly curved surface. In so doing the spring 42 is extended. Conversely, if the wiper blade assembly should move over a surface having a slight concavity, the extension spring 42 will expand, or open, the scissors linkage so as to maintain the squeegee unit in firm wiping contact throughout its length with such surface in combination with arm pressure from the holder 18.

Figure 4:
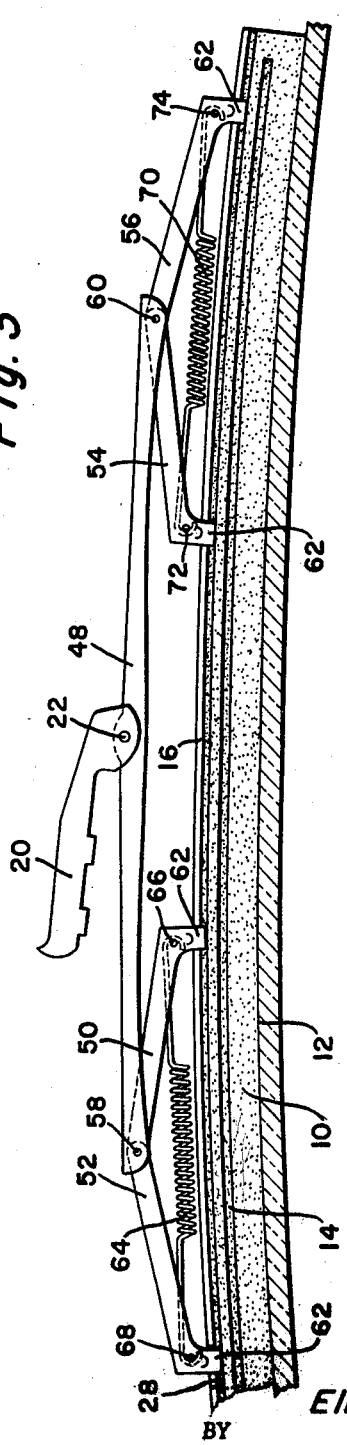
FIGURE 4 is a view similar to FIGURE 3 depicting the blade conforming to a convexly curved surface.

With reference to FIGURES 3 and 4, the squeegee unit used with the modified pressure applying superstructure is identical to that shown in FIGURES 1 and 2. In the embodiment of FIGURES 3 and 4, the pressure applying superstructure comprises a holder 48 having a conventional arm attaching part 20 connected thereto by a transversely extending pin 22 adjacent its center. The holder 48 is likewise of channel-shaped configuration, each end straddling a pair of pivotally interconnected links 50 and 52, and 54 and 56, respectively. The links 50 and 54 are adapted to be nestingly received between the side walls of the channel-shaped holder 48 under operating conditions. The links 50 and 52 are pivotally interconnected at their inner ends by a pin 58 which extends through the side walls of the holder 48. Similarly, the inner ends of the links 54 and 56 are pivotally connected by a pin 60 which extends through the side walls of the holder 48. The free end of each of the links 50, 52, 54 and 56 is formed with claws 62 identical with the claws of the first embodiment, the claws straddling the backing 16 of the squeegee in the manner aforedescribed. Similarly, the claw 62 adjacent the heel, or inner end of the squeegee, is shown detachably connected to the notched marginal side walls 28 thereof.

The links 50 and 52 are connected by an extension spring 64, opposite ends of which engage pins 66 and 68 carried by the links adjacent their outer ends. In a similar fashion the links 54 and 56 are interconnected by an extension spring 70, the ends of which engage pins 72 and 74 carried by these links. As in the first embodiment, the extension springs 64 and 70 tend to move the free ends of their respective links towards each other. Moreover, the springs 64 and 70 produce upward forces on the pins 58 and 60 adjacent the ends of the holder 48, and the reaction downward forces at the claws tend to maintain the squeegee unit in contact with the surface to be wiped.

When the arm pressure applied to the holder 48 through the connector 20 counterbalances the spring forces 64 and 70, the links 50 and 52, and the links 54 and 56 in effect constitute "yokes" which apply pressure at four longitudinally spaced apart points along the length of the squeegee unit.

As seen in FIGURE 4, the wiper blade assembly of the second embodiment will readily conform to a convexly curved surface due to pivotal movement of the several links, and at the same time maintain the wiping element in firm contact with the surface throughout its length. As the curvature of the surface varies the several links in the flexible surface conforming support for the wiping element will maintain the wiping element in firm wiping contact with such surfaces.

It will be appreciated that in both embodiments of the present invention the spring loaded flexible pressure applying superstructure will be operative to maintain the squeegee unit in contact with the surface to be wiped irrespective of external wind forces which tend to lift the wiper blade assembly from the windshield against the arm applied pressure. This will necessarily be so since any lifting movement of the arm from the windshield will immediately allow the internal spring means to come into play such that the reaction forces of the internal spring means will operate to maintain the wiping element in firm contact with the surface. Similarly, if wind tends to lift the blade superstructure, the action of the internal spring means will result in forces in a direction toward the windshield thereby resisting wind lift.

While the embodiment of the invention as herein disclosed constitute preferred forms, it is to be understood that other forms might be adopted.

What is claimed is as follows:

1. A wiper blade assembly including, a squeegee unit having an elongate flexible wiping element and an elongate flexible support therefor, and an elongate pressure applying superstructure comprising a holder having an arm attaching part, said holder being connected to said squeegee unit adjacent each end thereof, and a pair of pivotally interconnected crossed links carried by said holder and having their free ends connected to the intermediate portion of said squeegee unit, one of said crossed links being pivotally connected to said holder at its opposite end.

2. A wiper blade assembly including, a squeegee unit comprising an elongate flexible wiping element and an elongate flexible support therefor, and a pressure applying superstructure including holder means having an arm attaching means, said holder means being operatively connected with said squeegee unit adjacent each end thereof and a pair of crossed links carried by said holder means and pivotally interconnected between their ends, the free ends of said crossed links being operatively connected to the intermediate portion of said squeegee unit at longitudinally spaced points, one of said crossed links being pivotally connected to said holder at its opposite end.

3. A wiper blade assembly including, a squeegee unit comprising a freely flexible wiping element and an elongate resiliently flexible support therefor, wiper arm pressure applying means extending longitudinally of said squeegee unit and operatively connected thereto adjacent each end of said squeegee unit, and a pair of pivotally interconnected crossed links carried by said pressure applying means and having their free ends operatively connected to the medial portion of said squeegee unit, one of said crossed links being pivotally connected to said support at its opposite end, said pivotally interconnected crossed links acting conjointly to conform the medial portion of said squeegee unit to varying curvatures of a surface being wiped while said pressure applying means applies pressure to each end of said squeegee unit to conform the ends to such surface.

4. A wiper blade assembly including, an elongate, resiliently flexible wiper blade, and an elongate resilient flexible surface conforming support extending longitudinally of said blade for applying arm pressure to said blade adjacent each end thereof, and including a scissors-type equalizer linkage comprising a pair of crossed links pivotally interconnected between their ends, the free ends of said links being operatively connected with the medial portion of said blade, one of said links being pivotally connected to said support at its opposite end, said links acting conjointly in response to flexure of the end portions of said blade upon movement over a surface of varying curvature to conform the medial portion of said blade in accord with such surface.

5. The wiper blade assembly set forth in claim 4 wherein said crossed links are interconnected by an extension spring for applying conforming pressure to the medial portion of said blade.

References Cited in the file of this patent
UNITED STATES PATENTS

| | | |
|---|---|---|
| 1,472,240 | Chiron | Oct. 30, 1923 |
| 2,772,436 | Deibel | Dec. 4, 1956 |